(12) United States Patent
Verchere

(10) Patent No.: US 8,694,391 B2
(45) Date of Patent: *Apr. 8, 2014

(54) METHOD AND SYSTEM FOR CONFIGURATING PRODUCTS

(75) Inventor: David Verchere, New York, NY (US)

(73) Assignee: David Verchere, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/467,237

(22) Filed: May 9, 2012

(65) Prior Publication Data

US 2012/0221429 A1 Aug. 30, 2012

Related U.S. Application Data

(63) Continuation of application No. 12/608,135, filed on Oct. 29, 2009, which is a continuation of application No. 09/838,133, filed on Apr. 20, 2001, now Pat. No. 7,844,495, and a continuation-in-part of application No. 09/441,204, filed on Nov. 16, 1999, now Pat. No. 7,127,415.

(60) Provisional application No. 60/199,834, filed on Apr. 26, 2000.

(51) Int. Cl.
*G06Q 30/00* (2012.01)
(52) U.S. Cl.
USPC .......................................... 705/26.5; 705/26.1
(58) Field of Classification Search
USPC .................................................. 705/26.1, 26.5
See application file for complete search history.

(56) References Cited

U.S. PATENT DOCUMENTS

| | | |
|---|---|---|
| 3,757,037 A | 9/1973 | Bialek |
| 4,972,318 A | 11/1990 | Brown et al. |
| 4,992,940 A | 2/1991 | Dworkin |
| 5,099,422 A | 3/1992 | Foresman et al. |
| 5,109,337 A | 4/1992 | Ferriter et al. |
| 5,146,404 A * | 9/1992 | Calloway et al. .............. 705/1.1 |
| 5,311,438 A | 5/1994 | Sellers et al. |
| 5,550,735 A | 8/1996 | Slade et al. |
| 5,570,291 A | 10/1996 | Dudle et al. |

(Continued)

FOREIGN PATENT DOCUMENTS

WO  WO 97/24691  7/1997

OTHER PUBLICATIONS

ASI Products and Programs, 83 pages.

(Continued)

*Primary Examiner* — Yogesh C Garg

(57) ABSTRACT

The present invention relates to a method and system for configuring products, such as branded promotional products, where products may be divided into items and processes. Item parameters and process parameters may be separately specified and linked together to create a unique product where a product identifier (e.g., SKU) may be dynamically created when the product is sourced, quoted, ordered or otherwise accessed. For example, an item may involve a product to which an imprint or logo is to be affixed. A process may involve a screening printing process or other process for affixing a customer's artwork, logo or identifier. In addition, the method and system of the present invention may be applied to other applications, such as office supplies, furniture, aviation supplies, marine supplies, interior design, beauty salon and spa supplies, medical office supplies, restaurant and bar supplies, gift shops and clothing boutique, and other industries where products and services may be ordered.

15 Claims, 19 Drawing Sheets

(56) References Cited

U.S. PATENT DOCUMENTS

| | | | |
|---|---|---|---|
| 5,615,109 A | 3/1997 | Eder | |
| 5,666,493 A | 9/1997 | Wojcik et al. | |
| 5,694,551 A | 12/1997 | Doyle et al. | |
| 5,710,887 A | 1/1998 | Chelliah et al. | |
| 5,712,989 A | 1/1998 | Johnson et al. | |
| 5,715,399 A | 2/1998 | Bezos | |
| 5,721,832 A | 2/1998 | Westrope et al. | |
| 5,729,594 A | 3/1998 | Klingman | |
| 5,740,425 A | 4/1998 | Povilus | |
| 5,742,931 A | 4/1998 | Spiegelhoff et al. | |
| 5,758,328 A | 5/1998 | Giovannoli | |
| 5,790,426 A | 8/1998 | Robinson | |
| 5,794,217 A | 8/1998 | Colvin, Sr. | |
| 5,799,284 A | 8/1998 | Bourquin | |
| 5,825,881 A | 10/1998 | Colvin, Sr. | |
| 5,832,459 A | 11/1998 | Cameron et al. | |
| 5,845,263 A | 12/1998 | Camaisa et al. | |
| 5,860,068 A | 1/1999 | Cook | |
| 5,870,717 A | 2/1999 | Wiecha | |
| 5,884,045 A | 3/1999 | Kurihara | |
| 5,884,309 A | 3/1999 | Vanechanos, Jr. | |
| 5,890,175 A | 3/1999 | Wong et al. | |
| 5,895,454 A | 4/1999 | Harrington | |
| 5,897,622 A | 4/1999 | Blinn et al. | |
| 5,897,639 A | 4/1999 | Greef et al. | |
| 5,903,878 A | 5/1999 | Talati et al. | |
| 5,905,973 A | 5/1999 | Yonezawa et al. | |
| 5,907,617 A | 5/1999 | Ronning | |
| 5,913,210 A | 6/1999 | Call | |
| 5,918,213 A | 6/1999 | Bernard et al. | |
| 5,930,768 A | 7/1999 | Hooban | |
| 5,978,811 A | 11/1999 | Smiley | |
| 6,125,374 A | 9/2000 | Terry et al. | |
| 6,141,653 A | 10/2000 | Conklin et al. | |
| 6,167,383 A | 12/2000 | Henson | |
| 6,243,750 B1 | 6/2001 | Verma | |
| 6,344,853 B1 | 2/2002 | Knight | |
| 6,351,738 B1 | 2/2002 | Clark | |
| 6,414,693 B1 | 7/2002 | Berger et al. | |
| 6,414,893 B1 | 7/2002 | Miyamoto | |
| 6,493,677 B1 | 12/2002 | Von Rosen et al. | |
| 7,127,415 B1 | 10/2006 | Verchere | |
| 7,418,409 B1 | 8/2008 | Goel | |
| 7,590,558 B2 | 9/2009 | Chinnappan et al. | |
| 7,844,495 B2 | 11/2010 | Verchere | |
| 2001/0007981 A1 | 7/2001 | Woolston | |
| 2010/0106621 A1 | 4/2010 | Verchere | |

OTHER PUBLICATIONS

Umeda et al. "Knowledge Representation Model For Engineering Information Circulation of Standard Parts," Journal: Transactions of the Information Processing Society of Japan, Oct. 1997, vol. 38, No. 10, pp. 1905-1918.
"Bemrose: New Promotional products web site sets industry standard © 1994-2000," M2 Communications Ltd, proquest.uni.com, Apr. 2000, pp. 1-2.
"Branders.com expedites the purchase of promotional products," Direct marketing, Mar. 2000, vol. 62, No. 11, p. 66, Proquest.umi.com.
"Open Market: Open Market Announces New Modular Packaging to Provide Lower entry-level price," Presswire, Nov. 25, 1998.
"Fulfilling The Promise of The Internet At Starbelly.com," PR Newswire, Sep. 22, 1999, Dialog file 20 #07365792.
"Chase Capital Partners and Flatiron Partners Invest in Internet Company Starbelly.com," PR Newswire, Aug. 25, 1999, Dialog file 20 #06890229.
"Ventures Funds Online Business-to-Business Marketplace, BizBuyer.com; Next-Generation Bidding System Matches Small Business With Qualified Venders," Business Wire, Jun. 22, 1999, Dialog file 20 #05852020.
"BizBuyer.com Unviels Distinctive New Brand Identity; Leading Buisiness-to-Business Site Launches New User Interface and Comprehensive Marketing Effort," Buisiness Wire, Sep. 22, 1999, Dialog file 20 #07359348.
Graham "The Remaking of the Distribution Chain," American Salesman, Aug. 1999, Vol. 44, No. 8, pp. 3-8. Dialog flie 15 #1858228.
"Gifted Solutions Announces Its Gift Services Engine," Business Wire, Oct. 6, 1999, Dialog file 610 #00115430.
"Dell and The Internet Go From Strength To Strength," M2 Presswire, Jul. 7, 1998, Dialog file 20 #02143258.
Waters "Gateway Opens Promotional Products Web Site," St. Louis Post-Dispatch, Mar. 24, 1997, 3 pages.
Maurer "Internet Promotions,"Folio: The Magazine For Magazine Management, Feb. 1, 1998, vol. 27, No. 2, p. 28 ISSN #00464333.
"PromoMart Finds Internet Beats Radio and Television Advertising Second Year Running," PR Newswire, Sep. 18. 1998, 2 pages.
Gines "The Guide To Corporate Gift Giving," Incentive, Aug. 1998, 12 pages, ISSN #10425195.
"PictureMall Taps Internet Veteran Sandy Goldman as President & CEO and Changes Name to Pix.com," PR Newswire, Jul. 22, 1998, 2 pages.
Easton "Sunday Brunch: The Stuff; The Picture of Sweetness," The Los Angeles Times, Jun. 7, 1998, 1 pages, ISSN #04583035.
"CalComp, PictureMall.com Announce Strategic Marketing Partnership; Creation Station Users Can Link Directly to PictureMall.com and Receive Special Pricing On Products," Business Wire, Jun. 16, 1998, Dialog file 20 #01943255.
Promomart.com web pages extracted from www.archive.org Wayback Machine. Jan. 16, 1998, http://web.archive.org/web/19980116181228/http://www.promomart.com, 22 pages (all pages)
Lorge "Online Bidding Keeps Suppliers In Line," Sales and Marketing Magazine, Aug. 1998, vol. 150, No. 8, p. 16, ISSN #01637517.
Henry "But Can You Get It Wholesale?" Kiplinger's Personal Finance Magazine, Jul. 1998, vol. 52, No. 7, pages 115-117, ISSN #1056697X.
McAllister "Got Stuff to Sell? Someone Online Will Buy," Richmond Times Dispatch, Nov. 6, 1998, 2 pages.
"OpenSite Technologies Introduces Innovative Web Auction Partner Program," Business Wire, Aug. 4, 1998, 3 pages.
Dell Computer: www.dell.com web pages extracted from www.archive.org Wayback Machine, 30 pages, Jan. 13, 1998 (pp. 2-23 and 25), Dec. 2, 1998 (pp. 24, 26-28), Feb. 22, 1999 (pp. 29-30).
"New Paperless Purchase Order Moves Dell Computer Customer Premier Page Service A Step Closer To Virtual Integration," Business Wire, Jun. 16, 1998, 2 pages, Dialog file 20 #01939695.
Green et al. "Online Merchants; Cyberspace Winners: How They Did It," Business Week, Jun 22, 1998, No. 3583, p. 154, 6 pages, ISSN #07398395.
Maloney "Accrue Software," Fortune, Jul. 7, 1997, vol. 136, No. 1, pp. 102-104, ISSN #000158259.
Promomart: Internet Archive Wayback Machine, www.archive.org; http:/web.archive.org/web.../http://www.promomart.com; Jan. 16, 1998, 23 pages.
Bunn "Web Site Offers Opportunity for a Do-it-yourself Print Ad," Rocky Mountain News, Aug. 9, 1998, Proquest #32780962.
Busch "Companies Spin Own Webs With Intranets," Tulsa World, Aug. 25, 1996, p. E1, Proquest #17333510.
"911gifts.com Expands Features, Service and Merchandise to Rescue Holiday Shoppers," UU: Business Wire, Nov. 16, 1998, p. 1, Proquest #36002299.
911gifts.com: Internet Archive Wayback Machine, www.archive.org; http://web.archive.org/web/...../http://www.911gifts.com; Jul. 12, 1998, 4 pages.
Gonzalez "The 21st-Century Intranet," Prentice Hall, 1997, 1998, pp. 48-50, 5 total pages.
Moran "Business-to_Business Links Now—The Attention Turns to Extranets," Financial Times, Jun. 4, 1997, 3 pages, Proquest #12217826.
"Hyundai Selects Click Interactive to Provide Industry's First On-Line Parts-Ordering Extranet for Consumers and Repair Professional," Buisiness Wire, Aug. 13, 1998, 2 pages, Proquest #32825067.
"SpaceWorks OrderManager 4.0 Release Strengthens Order Management Automation Up and Down Supply Chains," PR Newswire, Sep. 23, 1998, 3 pages, Proquest #34498373.

(56) References Cited

OTHER PUBLICATIONS

Bort "Extranets Come in Different Styles. Do You Know Which is Best for Serving Your Business Partners? The Model Extranet," Network World, Mar. 30, 1998, vol. 15, No. 13, p. M19, 6 pages, Proquest #28244454.

Siegel et al. "The Intranet and Extranet," The CPA Journal, Feb. 1998, vol. 68, No. 2, p. 71, 4 pages, Proquest #26176218.

"Leed's and Littlearth Form Marketing Partnership; New Promotional Ideas Are "Licensed To thrill"," PR Newswire, Jan. 3, 2000, New York, 4 pages.

Bittel (ed) Encyclopedia of Professional Management, McGraw-Hill, Inc., Nov. 1978, pp. 739 and 958, ISBN 0-07-005478-9.

Turbide "Manufacturing systems," Sep. 1996, vol. 14, No. 9, pp. 84-90, ISSN: 0748-948X.

"PromoMart.com Inventory Doubles in Size," PR Newswire, Jan. 20, 1999.

"Calcomp, PictureMall.com Announce Strategic Marketing Partnership: Creation Station Users Can Link Directly to PictureMall.com and Receive Special Pricing on Products," Business Wire, Jun. 16, 1998.

"Promotional Marketing Strategies a Click Away With PromoMart's IDEA Store," Business Wire, Sep. 17, 1999.

"Golf Products on PromoMart Increase Exposure at Golf Tournaments," PR Newswire, May 26, 1998.

International Search Report for International (PCT) Patent Application No. PCT/US00/30433, mailed May 2, 2001.

Written Opinion for International (PCT) Patent Application No. PCT/US00/30433, mailed Aug. 16, 2001, 4 pages.

International Preliminary Examination Report for International (PCT) Patent Application No. PCT/US00/30433, mailed Nov. 19, 2001, 5 pages.

Official Action for U.S. Appl. No. 09/441,204, mailed Feb. 28, 2001 6 pages.

Official Action for U.S. Appl. No. 09/441,204, mailed Jul. 6, 2001 11 pages.

Office Action dated Dec. 5, 2001, U.S. Appl. No. 09/441,204, 12 pages.

Official Action for U.S. Appl. No. 09/441,204, mailed Aug. 27, 2002 15 pages.

Advisory Action dated Feb. 10, 2003. U.S. Appl. No. 09/441,204, 3 pages.

Official Action for U.S. Appl. No. 09/441,204, mailed Jul. 9, 2003 21 pages.

Official Action for U.S. Appl. No. 09/441,204, mailed Jan. 15, 2004 23 pages.

Official Action for U.S. Appl. No. 09/441,204, mailed Aug. 10, 2004 26 pages.

Examiner's Answer dated May 16, 2005, U.S. Appl. No. 09/441,204, 13 pages.

Decision on Appeal dated Mar. 26, 2006, U.S. Appl. No. 09/441,204, 13 pages.

Notice of Allowance for U.S. Appl. No. 09/441,204, mailed Aug. 1, 2006 20 pages.

Official Action for U.S. Appl. No. 09/838,133, mailed Apr. 28, 2004 12 pages.

Official Action for U.S. Appl. No. 09/838,133, mailed Oct. 13, 2004 21 pages.

Examiner's Answer dated May 4, 2006, U.S. Appl. No. 09/838,133, 18 pages.

Decision on Appeal for U.S. Appl. No. 09/838,133 mailed Sep. 11, 2008 17 pages.

Official Action for U.S. Appl. No. 09/838,133, mailed Dec. 11, 2008 13 pages.

Official Action for U.S. Appl. No. 09/838,133, mailed May 8, 2009 15 pages.

Notice of Aliowance for U.S. Appl. No. 09/838,133, mailed Sep. 30, 2009 8 pages.

Official Action for U.S. Appl. No. 09/838,133, mailed Feb. 2, 2010 7 pages.

Notice of Allowance for U.S. Appl. No. 09/838,133, mailed Jun. 24, 2010 6 pages.

Official Action for U.S. Appl. No, 12/608,135, mailed Jan. 4, 2011 9 pages Restriction Requirement.

Official Action for U.S. Appl. No, 12/608,135, mailed Feb. 23, 2011 14 pages.

Official Action for U.S. Appl. No, 12/608,135, mailed Oct. 27, 2011 11 pages.

Official Action for U.S. Appl. No. 12/608,135, mailed Aug. 30, 2013, 22 pages.

Official Action for U.S. Appl. No. 12/608,135, mailed Feb. 14, 2013, 22 pages.

\* cited by examiner

Product Configurator
Administrator

Administrator | Product Manager | Home

Product Category

Add [ ▽ ] 710

Administrators, create new product and process templates

Edit None Available 712

Delete None Available 714

Process Category

Add [ ▽ ] 720

Edit None Available 722

Delete None Available 724

FIG. 7

Product Configurator
New Corporate Gear Item Template - Mugs

Goods Categor Information - Mugs

- 810 — Sub Category: Travel
- 812 — Color: Ash, Black, Blue, Brown
- 814 — Material: Plastic

Quantity Break Pricing Information

|  | Minimum | Maximum |  | Minimum | Maximum |
|---|---|---|---|---|---|
| Sample | 1 | 2 | Break 1 | 100 | 500 |
| Break 2 | 501 | 1000 | Break 3 | 1001 | 0 |
| Break 4 | 0 | 0 | Break 5 | 0 | 0 |
| Break 6 | 0 | 0 | Break 7 | 0 | 0 |
| Break 8 | 0 | 0 | Break 9 | 0 | 0 |

(816)

Miscellaneous Pricing Information

- 818 — Misc Charge 1 ☑ $ ☐ % | per item | Name: Gift Box
- 820 — Misc Charge 2 ☐ $ ☐ % | per color | Name:
- 822 — Less Than Charge ☑ $ ☐ % | per item |
- 824 — Rush Charge ☐ $ ☑ % | per job |

Imprint Positions

| Front | Handle |
|---|---|
|  |  |
|  |  |

(826)

Save | Cancel

FIG. 8

Product Configurator
New Product - Mugs - Travel (Plastic)

General Information - Mugs - Travel (Plastic)

Product Name: Plastic Travel Mug
Vendor ID Number: ABC001
Item Description: Ideal for on the road thirst
Colors: Black, Blue, Brown
} 1010

Quantity price break values
Net Pricing

1 - 2       $15.00
100 - 500   $9.00
501 - 1000  $8.00
1001 - ÷    $7.00
} 1012

Miscellaneous price break values

Gift Box              $  $1.00   per item
Less Than Min Charge  $  $2.00   per item
Rush Charge           %  20      per job
} 1014

Imprint Positions

☑ Front       ☐ Handle
2 x 2 in.     0 x 0 in.
} 1016

FIG. 10a

Shipping Information

Weight per item  Weight per case  Items per case
[ .5 ] lbs.      [ 50 ] lbs.      [ 100 ]           } 1018

Case width       Case height      Case Length
[ 12 ] in.       [ 12 ] in.       [ 12 ] in.

Production Time(s)

Regular Prod.              Rush
[ 14 ] working days        [ 7 ] working days       } 1020

Production information

List price    $ [ $7.00 ] per item
List Description  [ Price does not include processing ]   } 1022
Country of Manufacturer  [ China ▽ ]
Union Made    [ No ▽ ]

Save | Cancel | Net | Case | MSRP | Other

FIG. 10b

Product Configurator
New Process Template - Screen Printing
Administrator | Product Management | Home General Information - Screen Printing Sub Category　　　Standard　1210

Number of Colors　3 ▽　1212

Process on Material

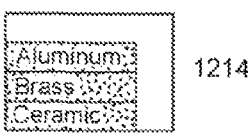 1214

Over Imprint Size Add　☐ $ ☑ %　☐ Process Not Available　1216

Quantity Break Pricing Information

|  | Minimum | Maximum |  | Minimum | Maximum |
|---|---|---|---|---|---|
| Break 1 | 100 | 1000 | Break 2 | 1001 | 500 |
| Break 3 | 1501 | 0 | Break 4 | 0 | 0 |
| Break 5 | 0 | 0 | Break 6 | 0 | 0 |
| Break 7 | 0 | 0 | Break 8 | 0 | 0 |
| Break 9 | 0 | 0 | Break 10 | 0 | 0 |

} 1218

Miscellaneous Pricing Information

Set up charge ☑
PMS Color Match ☑
Misc Charge 1　☑ $ ☐ %　per color ▽　Name Scatter Color
Misc Charge 2　☐ $ ☐ %　per color ▽　Name
Less Than Min Charge　☐ $ ☑ %　per item ▽
Rush Charge　☐ $ ☑ %　per item ▽
Metallic Thread Charge　☐ $ ☐ %　per color ▽
Misc Charge 3　☐ $ ☐ %　per color ▽
Misc Charge 4　☐ $ ☐ %　per color ▽

} 1220

Save | Cancel

FIG. 12

Product Configurator
Product Manager – ABC Promotions
Administrator | Product Management | Home
Product Managers - Choose your own product or process template and start entering specifications.
Create New
Product 
Process 
} 1310
Product
Edit 
Delete 
} 1312
Process Maint.
Edit     None Available
Delete   None Available
} 1314
FIG. 13

Product Configurator
New Process - Screen Printing - Standard

General Information - Screen Printing - Standard

| | |
|---|---|
| Process Name | Standard Screen Printing |
| Vendor ID Number | ABC002 |
| Process Description | High Quality Screen Printing |
| Process on Material | Ceramic / Cotton / Aluminum |
| Imprint Limitations | 2 X 2 In. or larger than 12 X 12 In. |
| Over Imprint Size Add | % 20 |

⎱ 1410

Quantity price break value

Net Pricing

| | 1 Color | 2 Color | 3 Color |
|---|---|---|---|
| | $0.50 | $0.90 | $1.30 |
| 1001-1500 | $0.40 | $0.78 | $1.10 |
| 1501 - ÷ | $0.30 | $0.65 | $0.80 |

⎱ 1412

Enter your Vendor Service Station

Miscellaneous price break values

| | | | |
|---|---|---|---|
| Setup Charge | $ | 15.00 | per color/location |
| PMS Color Match | $ | 30.00 | per color |
| Scatter Color | $ | 8.00 | per color |
| Less than Min Charge | % | 10 | per item |
| Rush Charge | % | 20 | per item |

Product Information

| | | |
|---|---|---|
| List Price | $ [$0.30] | Per item |
| List Description | [List price is for one color one] | |
| Regular Time | [0] | Business Days |
| Rush Time | [0] | Business Days |
| Country of Manufacturer | [United States ▽] | |
| Union Made | [Yes] | |

} 1416

Save | Cancel    Net | Case | MSRP | Other |

FIG. 14b

Vendor Service Station

Product Manager

Administrator | Product Management | Home

Product Managers - Enter pricing and specifications for a product.

Small Image: [_____] Browse

Medium Image: [_____] Browse

Large Image: [_____] Browse

Upload   Cancel

FIG. 15

Product Configurator
Edit Product - Mugs - Plastic Travel Mug (Plastic)

General Information - Mugs - Plastic Travel Mug (Plastic) Standard

| | |
|---|---|
| Product Name | Plastic Travel Mug |
| CG Number | CG800367 |
| Vendor ID Number | ABC001 |
| Item Description | Ideal for on the road thirst |
| Colors | Black, Blue, Brown |

⎫ 1610

⬜ 1612

Quantity price break values
Net Pricing

| | |
|---|---|
| 1 - 2 | $15.00 |
| 100 - 500 | $9.00 |
| 501 - 1000 | $8.00 |
| 1001 -÷ | $7.00 |

⎫ 1614

Miscellaneous price break values

| | | | |
|---|---|---|---|
| Gift Box | $ 1 | per item | |
| Less Than Min Charge | $ 2 | per item | |
| Rush Charge | % 20 | per job | |

⎫ 1616

Enter your Vendor Service Station

Imprint Positions

| ☑ | ☐ |
|---|---|
| Front | Handle |
| 2 × 2 | 0 × 0 |

⎫ 1618

☑  FIG. 16a

Shipping Information

Weight per item: 0 lbs.
Weight per case: 50 lbs.
Items per case: 100 lbs.

Case width: 12 in.
Case height: 12 in.
Case length: 12 in.

} 1620

Production Time(s)

Regular Prod.: 14 working days
Rush: 7 working days

} 1622

Production information

List Price: $ 7 per item
List Description: Price does not include processing
Country of Manufacturer: China
Union Made: No

} 1624

Save | Cancel | Net | Case | MSRP | Other

FIG. 16b

METHOD AND SYSTEM FOR CONFIGURATING PRODUCTS

CROSS-REFERENCE TO RELATED APPLICATIONS

This application is a Continuation of U.S. patent application Ser. No. 12/608,135, filed Oct. 29, 2009, which is a continuation patent application of U.S. patent application Ser. No. 09/838,133, filed Apr. 20, 2001, now U.S. Pat. No. 7,844,495, entitled "A Method and System for Configurating Products," which claims the benefit of and priority to U.S. Provisional Application Ser. No. 60/199,834, filed Apr. 26, 2000 and is a continuation-in-part patent application of U.S. application Ser. No. 09/441,204, filed Nov. 16, 1999, entitled "Method and System for Acquiring Branded Promotional Products," now U.S. Pat. No. 7,127,415 B1 to D. Verchere, each of which are incorporated herein by reference in their entirety.

FIELD

The subject matter disclosed herein relates to methods and systems of purchase within the branded promotional products industry and a method and system for configuring products (e.g., branded promotional products) where products may be divided into items and processes wherein item and process parameters may be separately specified and linked together to create a unique product where a product identifier (e.g., SKU) may be dynamically created when the product is sourced, quoted, ordered or otherwise accessed.

BACKGROUND

Branded promotional products include advertising, sales promotion and marketing communications media that use merchandise imprinted with an advertiser's identification, message or logo. These items effectively communicate a brand identity or a message and are used to create brand awareness, solidify customer relations and increase sales. The branded promotional products sector of the advertising industry provides unique marketing opportunities. Branded products are easy to understand and are useful in meeting many marketing objectives such as announcing a name change or building a company image.

The personal touch inherent in gift giving makes branded product advertising a high-impact tool when used in conjunction with other media. Typical uses include building brands, launching products, introducing reminder advertising, improving customer relations, generating new customers and/or accounts, increasing traffic and awareness at trade shows, safety programs, annual meetings, seasonal events, public relations, employee relations, and other advertising and marketing uses.

Branded promotional products are adopting a more active role in marketing as mass media such as print and television integrate with other promotional efforts. Because branded products provide a personal touch, they are effective and important marketing tools.

Customers increasingly expect more value from their purchasing experience with a high quality product that promotes their brand. They want a useful product obtained through a convenient transaction. Customers are often frustrated because they have to rely on a reseller for purchasing options and the flow of information. Resellers are expected to find customers favorable prices, produce samples and ensure timely delivery.

Currently, vendor partners have little or no contact with customers and rely on resellers to reach customers. Vendor partners spend significant amounts of effort and money providing price quotes and samples to resellers. It is difficult for vendor partners to gather product or customer market research and customer buying pattern information.

Traditionally, the promotional products industry has operated under a linear supply-chain model of distribution. Typically, the customer hires a reseller to assist in selecting a branded product for an event or promotion. The reseller locates the desired merchandise through established vendor partner relationships. The vendor partner manufacturers or imports the items, adds the brand, and ships the product. Business service partners provide services such as shipping, financing, and insurance. Media partners deliver educational and other useful information.

Thus, a comprehensive solution for all members of the promotional products industry that includes high quality products, current and accurate information, and support services with the result that the end user has a consistent, reliable and productive experience is needed.

Promotional products have widely been used to promote a brand name or image, build customer awareness and/or announce a presence in an industry. Branded promotional products may include advertising, sales promotion and marketing communications media. These products generally include various types of merchandise imprinted with an advertiser's identification, message or logo. The branded promotional products sector of the advertising industry provides unique marketing opportunities. Branded products are easy to understand and useful in meeting many marketing objectives, such as announcing a name change or building a company image.

Customers seek high quality products that effectively promote their brand and logo. They want a useful product obtained through a convenient transaction. However, customers are often frustrated because they have to rely on a reseller (or distributor) for purchasing options and the flow of information. Generally, resellers are expected to find customers favorable prices, produce samples and ensure timely delivery.

Currently, vendors have little or no contact with customers and rely on resellers (or distributors) to reach customers. Vendors spend significant amounts of effort and money providing price quotes and samples to resellers (or distributors). It is difficult for vendors to gather product or customer market research, customer buying pattern information, and other customer related information.

Traditionally, the promotional products industry has operated under a linear supply-chain model of distribution. Typically, a customer hires a reseller (or distributor) to assist in selecting a branded product for an event or promotion. The reseller locates the desired merchandise through established vendor partner relationships. The vendor manufacturers or imports the items, adds the brand, and ships the product. In addition, a second vendor may add the process which may include branding. Business service partners provide services such as shipping, financing, and insurance. Media partners deliver educational and other useful information. Similar problems arise in other industries as well.

Currently, a standard method for purchasing products (e.g., branded promotional products) has been difficult to implement due to the uniqueness of products and enormous number of possible product and process combinations. For example, a company or other entity may regularly purchase promotional products for advertisement, brand awareness and other purposes. In addition, a company may promote new products on a regular basis and make frequent improvements on current products. Therefore, repeated orders for promotional products may be required for similar products with different printing processes, for example. Similarly, the same or similar printing process may be used on different products. Due to the overlap in items and processes, inefficiencies may occur when ordering promotional or other products, especially when orders are frequently repeated. Typically, each process is stored with each item. As a result, it may become inefficient and redundant to store each process with each item when the processes may be the same or similar.

Oftentimes, a vendor (or distributor) may attempt to define all possible product stock keeping units ("SKUs") when presenting promotional products options to a customer. An SKU is a number or identifier associated with a product for inventory purposes. This creates inefficiencies and duplicated efforts because the product does not become a SKU until the item and process are combined. Presently, there is no standard method of specifying promotional products because they are so varied and numerous.

In other industries, a service or product provider may order supplies and inventory on a regular basis. Such industries may include office supplies, furniture, aviation supplies, marine supplies, interior design, beauty salon and spa supplies, medical office supplies, restaurant and bar supplies, gift shops and clothing boutique, and other industries where orders for various products or requests for services may be placed. Similarly, inefficiencies develop due to the overlap of analogous orders and purchases over time.

These and other drawbacks exist with current systems.

SUMMARY

An object according to the subject matter disclosed herein is to overcome these and other drawbacks with existing systems.

It is an object of the subject matter disclosed herein to create a central, real-time exchange serving customers, resellers, vendor partners, business service partners and media partners.

It is another object of the subject matter disclosed herein to provide customers with a fast, cost efficient and simplified e-commerce solution to promote a brand.

It is another object of the subject matter disclosed herein to provide resellers with the opportunity to leverage their sales efforts by streamlining the process of sourcing and pricing products and automating tedious administrative tasks.

It is another object of the subject matter disclosed herein to provide vendor partners with an e-commerce end-to-end business solution to manage the cataloguing, production and distribution process.

It is another object of the subject matter disclosed herein to provide business service partners with the opportunity to offer services such as shipping, insurance, and financing.

It is another object of the subject matter disclosed herein to provide media partners with the opportunity to provide resources, such as educational materials, literature and conference information to members of the promotional products industry.

The subject matter disclosed herein provides an all-encompassing exchange that offers scaling opportunities and economies not available in the traditional business model. An online industry standard pipeline for data and order flow manages the production and distribution process from beginning to end. The subject matter disclosed herein offers a selection of high value, high quality promotional products available online. The process of selection, pricing, ordering and branding of merchandise is facilitated through the subject matter disclosed herein. In addition, support services including shipping, financing, insurance and other essential business services are provided by the subject matter disclosed herein. Market and customer research information is also available.

An object according to the subject matter disclosed herein is to overcome these and other drawbacks with existing systems.

Another object of the subject matter disclosed herein is to provide a standard method and system for configurating products where separate parameters for item and process may be identified.

Another object of the subject matter disclosed herein is to create SKUs (or other product identifiers) dynamically by separating products into items and processes (or other categories), specifying item parameters, specifying process parameters, dynamically linking an item and process and creating a SKU when the product is sourced, quoted, or ordered.

Another object of the subject matter disclosed herein is to apply the method and system of the subject matter disclosed herein to the fields of branded promotional products, office supplies, furniture, aviation supplies, marine supplies, interior design, beauty salon and spa supplies, medical office supplies, restaurant and bar supplies, gift shops and clothing boutique. Other applications may be available for industries where orders for various products or requests for services may be placed.

The subject matter disclosed herein provides the ability to link manufacturers, distributors and end-use corporations to the industry's complete e-marketplace. The subject matter disclosed herein gives manufacturers and distributors the tools to sell more and spend less by taking advantage of the efficiency of e-commerce, while preserving the traditional methods of doing business. The subject matter disclosed herein may use live data thereby making transactions more efficient, accurate and less complicated. The subject matter disclosed herein enables manufacturers and distributors to maintain and control the product prices displayed on their web sites as well as the prices seen by individual customers. In addition, manufacturers, distributors and other users may create custom web sites, —for individual markets and companies.

Other objects and advantages of the subject matter disclosed herein will be apparent to one of ordinary skill in the art upon reviewing the specification herein.

BRIEF DESCRIPTION OF THE DRAWINGS

FIG. 7 is an example of a screen shot of an administrator page of a product configurator according to an embodiment of the subject matter disclosed herein.

FIG. 8 is an example of an item template according to an embodiment of the subject matter disclosed herein.

FIGS. 10a and 10b are an example of an item definition page according to an embodiment of the subject matter disclosed herein.

FIG. 12 is an example of a process template according to an embodiment of the subject matter disclosed herein.

FIG. 13 is an example of a product manager page according to an embodiment of the subject matter disclosed herein.

FIGS. 14a and 14b are an example of a process definition page according to an embodiment of the subject matter disclosed herein.

FIG. 15 is an example of an image upload page according to an embodiment of the subject matter disclosed herein.

FIGS. 16a and 16b are an example of an item definition page edit according to an embodiment of the subject matter disclosed herein.

DETAILED DESCRIPTION

Figure 1:
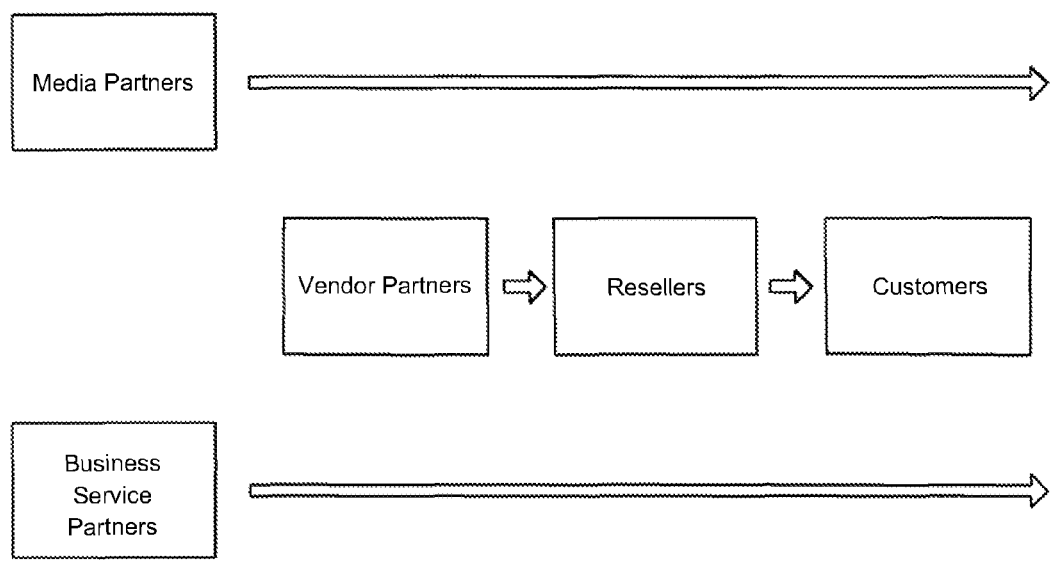
FIG. 1 is a diagram of a traditional promotional products industry under a linear supply chain model of distribution.

The subject matter disclosed herein provides a central real-time exchange. This exchange creates a community environment for all participants in the promotional products industry and provides services that establish a web presence for each member. Business-to-business services available to each member through the exchange promotes operational efficiency and cost effectiveness. The goal of the exchange is to build a core foundation of services for use over the Internet that provides an easy and global method of facilitating business transactions amongst its members in a common environment.

Members of the promotional products industry may include customers, resellers, vendor partners, business partners and media partners. Customers may be an end-user of promotional products. Usually, customers include individuals who buy products directly through the subject matter disclosed herein. Resellers may be distributors who resell goods and services to the customer. Vendor Partners may include suppliers who offer products and imprinting services. Media Partners may offer content, e.g., industry magazines, industry research organizations, and expert columnists. Business Service Partners may offer services such as fulfillment, shipping, insurance and financing.

The subject matter disclosed herein provides customers with an easy, efficient method of purchasing branded promotional products online. The subject matter disclosed herein enables customers to browse through a set of products of interest. The customer's logo and artwork may be securely maintained in a readily available personal or corporate online library. Customers are also provided with the ability to view their firms' logo applied directly to the products selected. The production and delivery of orders online may be tracked by the subject matter disclosed herein where the customer is given access to the order status on demand. In addition, reminders for recurring events may be sent to the customer. The subject matter disclosed herein may also create custom web pages for corporate clients to manage their branding program and products.

The subject matter disclosed herein provides resellers the opportunity to leverage their sales efforts by streamlining the process of sourcing and pricing products and automating tedious administrative tasks. Other services may include a selection of high quality products from vendor partners; timely information on new products; seasonal and special offers; online order tracking; shipping, insurance and financing options; customer ordering; demographic and usage data and market research information.

The subject matter disclosed herein provides vendor partners the ability to manage the cataloguing, production and distribution processes. The subject matter disclosed herein may collect, house and distribute product images, specifications, and pricing information. Vendor partners may update this information online and on demand. The subject matter disclosed herein may track order, production and billing information flow and make this information available online; arrange financing to eliminate accounts receivable and credit risk; and record customer, ordering, demographic and usage information. Also, vendor partners may create and maintain unique web-site and datalinks. Vendor partners may also bid on customer orders through the subject matter disclosed herein. Thus, the subject matter disclosed herein provides an incentive for vendor partners to continue entering data and maintaining data as accurately as possible by offering the ability to resell the information.

The subject matter disclosed herein may leverage web site income by developing additional sources of revenue from business service partners. Services such as fulfillment, shipping, insurance, financing and other sources of revenue may be offered to facilitate the order process and to lower overall costs.

The subject matter disclosed herein provides media partners the ability to resell educational materials, literature and conference information and sell space for industry-relevant advertising. The subject matter disclosed herein provides a forum where any member of the promotional products industry may find and purchase appropriate resources.

FIG. 1 is a diagram of a traditional promotional products industry under a linear supply-chain model of distribution. In this model, the customer hires a reseller to find a branded product. The reseller locates the product to be branded through a vendor partner. The vendor partner provides the product requested, imprints the logo or brand and ships the product to the reseller who then sells the product to the customer. Business service partners provide various services, such as shipping, financing and insurance. Media partners provide educational materials, literature, conference information and other useful information.

Figure 2:
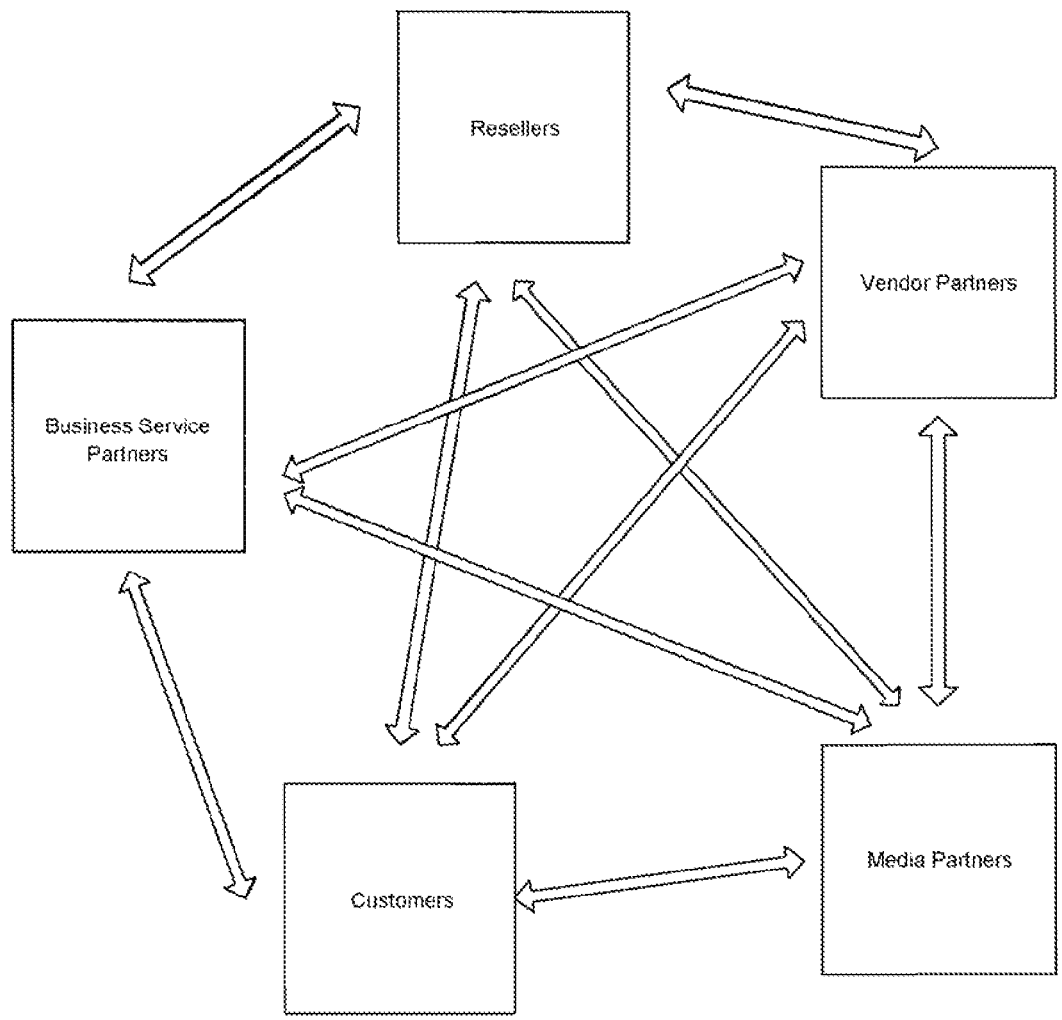
FIG. 2 is a diagram of a central real-time exchange according to the subject matter disclosed herein.

FIG. 2 is a diagram of a central real-time exchange model according to the subject matter disclosed herein. Each member of the promotional products industry may exchange information and requests over the Internet. This promotes efficiency and facilitates business relationships. One object of the central real-time exchange is to bring the members of the industry together in a business-to-business e-commerce environment over the Internet. Another objective is to standardize the practices in the industry by providing efficient services for each member.

Figure 3:
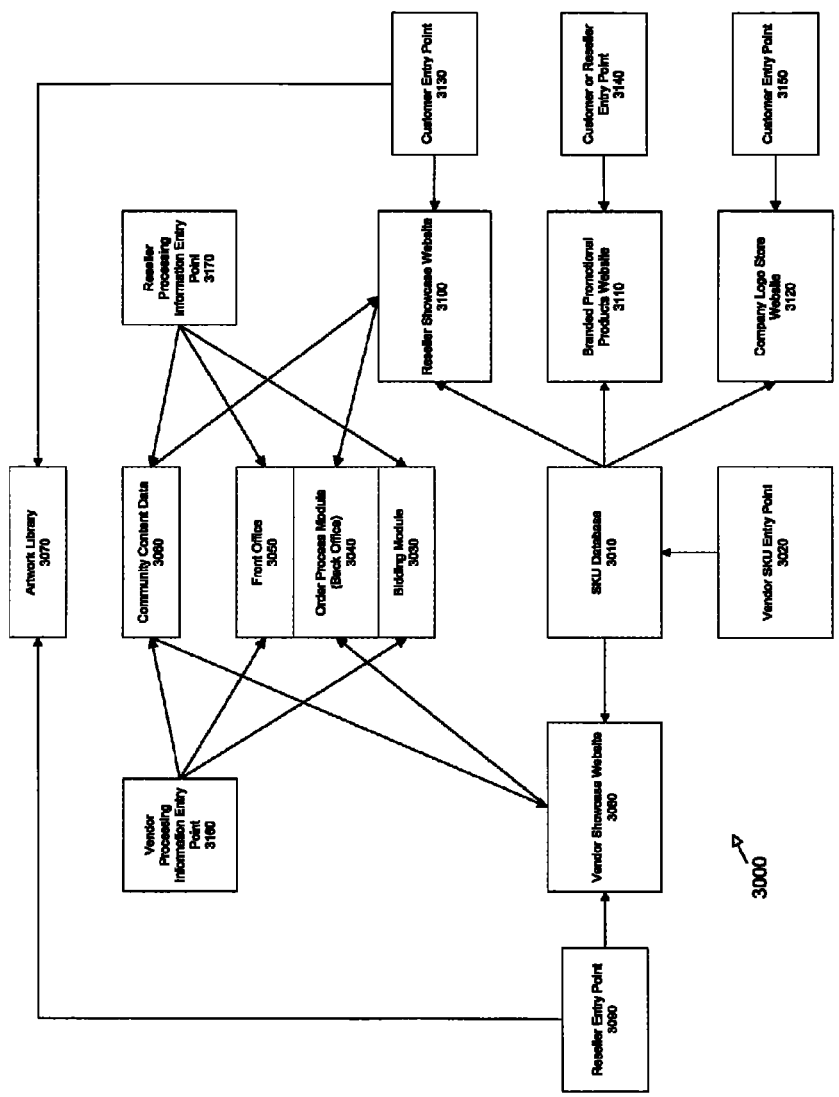
FIG. 3 is a detailed diagram of a central, real-time exchange according to an embodiment of the subject matter disclosed herein.

FIG. 3 is a detailed diagram of a central real-time exchange according to an embodiment of the subject matter disclosed herein. The overall exchange structure 3000 may be programmed to be stateless in a preferred embodiment. This allows for greater scalability as well as database protection.

The Stock Keeping Unit ("SKU") database 3010 may include vendor product, pricing, service, and imprinting information. A SKU is assigned to every vendor partner product including variations within a product category. For example, a blue pen has a different SKU than a red pen. Vendors may enter product information in the SKU database at vendor entry point 3020. Information entered may include general product information; imprinting information based on dynamic product entry; quantity breaks; net pricing per quantity; net setup costs by imprint method, number of locations, and number of imprint colors; net run charges per quantity based on imprint colors; a markup percentage added for each quantity to create their own retail pricing and other similar product information. Vendors may also enter a flag to delete a product and all associated artwork files. Vendors may upload an original product artwork file at any time for any or all SKUs generated for a product.

The vendor may specify calendar dates to display his or her products on the web-site of the subject matter disclosed herein. Vendors may elect product placement at an editorial level, product placement at a homepage level, or search position product placement. The product placement at an editorial level allows vendors to position an SKU in the content area of the web-site of the subject matter disclosed herein. The product placement at a homepage level allows vendors to position a SKU on the homepage of the web-site of the subject matter disclosed herein. The search position product placement allows vendors to select the position of product display in a search. Also, the search position product placement may be selected based on product list, price point, category, idea or department, text search, and other criteria. This feature allows vendors to select exact placements of products depending on the popularity of the product and marketing strategies.

Vendor Showcase Web-site 3080 may display vendor product information and provide inquiry and ordering access to resellers at the reseller entry point 3090. Vendors may customize their web-site by choosing which SKU images to display on their showcase web-site and other features available. Vendors may offer various services on their web-site to resellers. For example, resellers may order products for their customers from the Vendor Showcase Web-site, receive price information, create purchase quotes for customers, and other related services.

The Branded Promotional Products web-site 3110 provides a variety of promotional products, inquiry and ordering access to customers and resellers at 3140.

Services available may include the ability to view a selection of high quality products and their images; select products based on a variety of criteria; view the product unit price, setup price, and run charges; offer a quote service showing prices at quantity breaks and order products from the web-site where orders may be charged to a credit card or to a credit account opened with the subject matter disclosed herein. In addition, customers and resellers may receive acknowledgements for orders placed; attach artwork files; order history listing quotes and acknowledgements; review industry and media content; select services provided by business partnerships; select shipping method; customize a search and receive other similar options available to a customer or reseller.

Reseller Showcase Web-site 3100 may display products selected by the reseller for resale to his or her customer at 3130. Resellers may customize their showcase web-site by choosing which SKU images to be displayed. Resellers may choose to display non-branded SKU images or their own logo on the SKU images.

Resellers may offer various services to their customers through their Showcase Web-site 3100. Such services may include allowing the customer to view the product unit price, setup price and run charges; offering a quote service for customers to generate a quote for themselves showing prices at quantity breaks; ordering products from the web-site; attaching artwork files and other product related services.

Company Logo Store Web-site 3120 may display products selected by a particular reseller or store owner for resale to his or her customers at 3150. Company Logo Stores include a specialized showcase web-site carrying products branded with a particular company's logo. Resellers may offer various services to customers on their Company Logo Site. Such services may include allowing the customer to view the product unit price; offering a quote service for customers to generate a quote for themselves showing prices at quantity breaks; allowing customers to order products from the web-site; selecting services provided by business partnerships and other related services.

Order Process Module or Back Office 3040 may check credit, process orders and generate appropriate payment and accounting entries. Back Office 3040 may process orders which includes receiving orders from credit card processing, checking the credit account, reviewing/editing and releasing the purchase order to the product and/or an imprinting vendor, creating vouchers, calculating financing charges, sending automatic email responses back to customers or resellers when an order is actually shipped and providing other related services.

As to the Vendor Showcase Web-site 3080, Back Office 3040 may review/edit and release purchase orders to the Branded Promotional Products web-site 3110, review/edit and release change order purchase orders on an existing order and provide other similar services.

As to the Reseller Showcase Web-site 3100, Back Office 3040 may review/edit and release purchase orders to the Branded Promotional Products web-site 3110, review/edit and release change order purchase orders on an existing order, and provide other similar services.

As to the Company Logo Store, the services mentioned above may also be offered along with the ability to view product inventory balances.

The Front Office 3050 provides communication between members of the promotional products industry. It may also provide order status and history information. Services available to customers and resellers may include viewing/editing reseller or customer descriptive shopper information; viewing reseller or customer order history and purchases; viewing vendor order status, due date and shipping information for an order; directing email to customers or resellers on order delays and updates, updating customer or reseller service histories, viewing current balance on term accounts and providing other related services.

Specific Vendor Showcase Web-Site 3080 services may also be made available through the Front Office 3050. Vendors may view reseller shopper information, view reseller order history and purchases, send automatic email responses back to the reseller when the order is shipped, and other related options.

Services available to customers may include viewing/editing customer shopper information; viewing order history and purchases; viewing vendor order status, due date and shipping information; sending automatic email responses to customers when order is shipped, delayed or updated, and other related services.

Specific Reseller Showcase Web-site 3100 services may include viewing customer shopping information; viewing customer order history and purchases; sending automatic email responses informing the customer of the status of the order and other related services.

Company Logo Store 3120 services may include viewing order history; viewing/editing shopper information; viewing status, due date, shipping information, current balance and other related services.

In addition, Front Office 3050 may offer market information services for vendors, resellers and customers, such as account summary option, web hits habit reports, and other related market information.

Bidding Module 3030 may provide a forum where resellers or customers present orders and vendors bid on these jobs. Bidding Module 3030 may provide services such as posting price bids on products or imprinting orders; editing or withdrawing bids before terms are accepted; quality control on bids; sending automatic email notices to vendors on being awarded the order; and other related services.

Vendors may post price bids on products or imprinting orders on an auction site provided by the Bidding Module 3030. Resellers may view the auction site and see price bids related to their product or service and even send automatic email notification to resellers and reseller's customers.

Community Content Data 3060 may provide an interface with media partners and business partners where customers, resellers and vendors are offered various services. Vendor may enter processing information at 3160 and Resellers may enter processing information at 3170.

Media or business partners may offer services on the Branded Promotional Products Web-site 3110. These services may include posting job listings pertaining to the promotional product industries, providing education to customers, providing "Ask the Expert" services to customers, providing an alert system for customers, and informing the customer of industry statistics and advanced reports. In addition, design services on web-sites may be provided for customers, resellers or vendors to include artwork recommendations, creation and retouching.

The Artwork Library 3070 may store customers' logos and branding artwork. Customers may create a library and store their company brand logos online. This makes it easier for customers to put their logos on promotional products. Customers may share their art library with other users by granting them access with a password. In addition, customers may add, edit and delete their logos in their art library.

Figure 4:
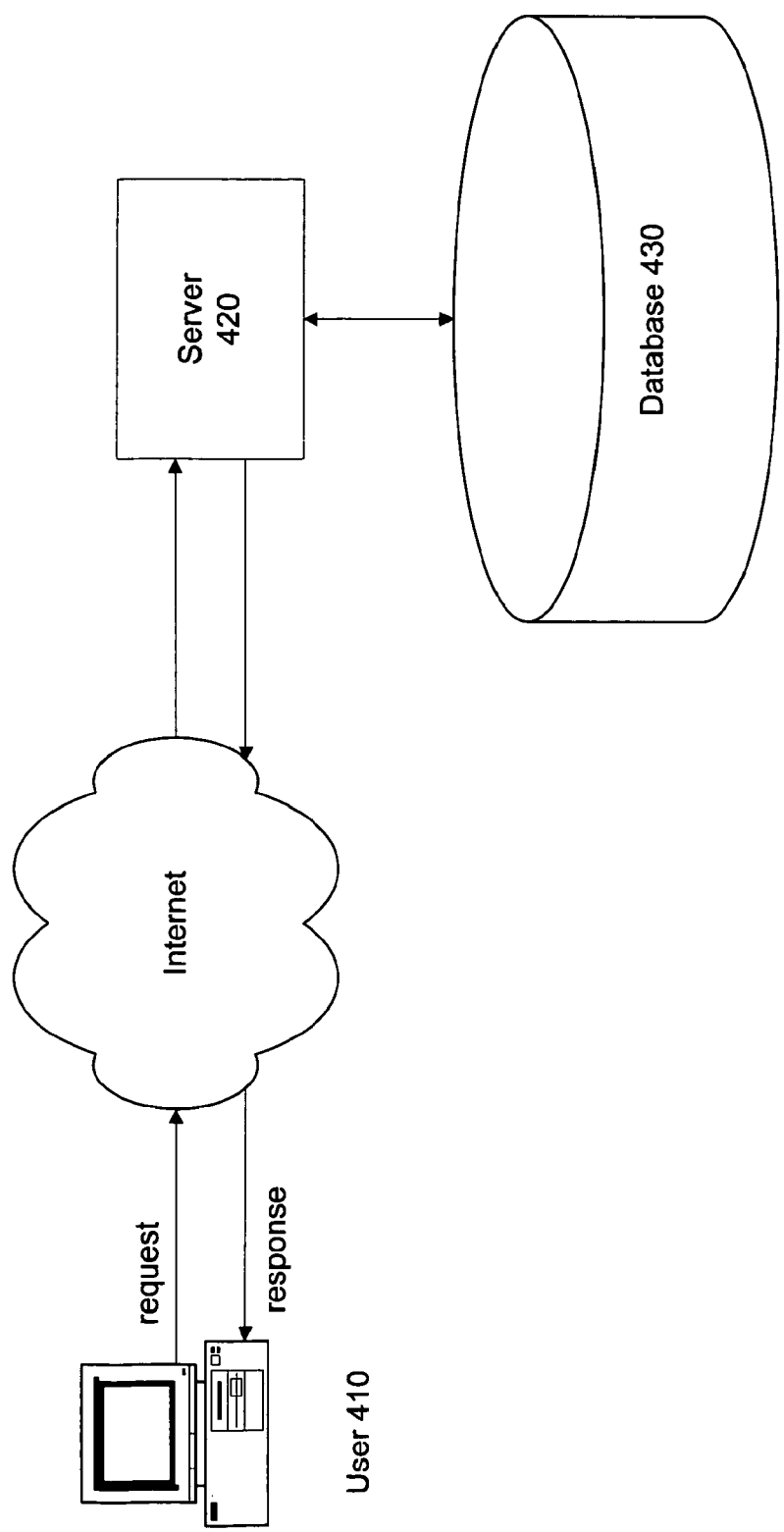
FIG. 4 is a diagram of an overall system according to the subject matter disclosed herein.

FIG. 4 is a diagram of an overall system according to the subject matter disclosed herein. The user 410, who may be a customer, a reseller, a vendor partner, a business service partner or a media partner, may request a product or service from server 420 through the Internet. Server 420 then retrieves the requested information from database 430. A response is presented to the user once the requested information is obtained.

In a preferred embodiment, the subject matter disclosed herein may use Microsoft's Internet operating system, Microsoft Site Server Commerce Edition as the e-commerce shopping solutions, Microsoft SQL Server, Microsoft technologies Transaction server and Message queue as data layer servers.

Promotional products may include useful or decorative merchandise imprinted with an advertiser's identification, message or logo artwork. Various processes may be used to imprint artwork on a vast array of items and materials. Generally, promotional products may consist of two or more components, which may include an item (e.g., a mug) and a process (e.g., screen printing). Other features or components may be specified. A customer's artwork used in the imprint process may include specifications such as number of colors, imprint locations on the item, imprint sizes and other details.

In addition, the method and system of the subject matter disclosed herein may be applied to other applications, such as office supplies, furniture, aviation supplies, marine supplies, interior design, beauty salon and spa supplies, medical office supplies, restaurant and bar supplies, gift shops and clothing boutique, and other industries where products and services may be ordered.

A method and system of the subject matter disclosed herein may create SKUs (or other identifiers) dynamically. For example, products may be separated into items and processes. Item parameters may be specified. Process parameters may also be specified separately. The item and process parameters may then be linked to create a SKU (or other identifier) when the product is sourced, quoted, ordered, or otherwise accessed. Categories of items and processes may be defined for different industries. For example, in the field of office supplies, item categories may include pens, staplers, paper, telephones, and other office supplies. Process categories may include manufacturing processes and other processes associated with office supplies. For example, an item may include a chair while a process may include a method for covering. Options related to chairs may include structural factors, such as height, width, etc. Other options may include swivel ability, arm rest features, etc. In addition, various details may be associated with the covering process, such as material, color, type of process and other factors. Since the same process may be applied to multiple items, such as other types of furniture (e.g., sofas, ottoman, etc.), besides office chairs, it is more efficient to store the process once instead of with each applicable item.

Figure 5:
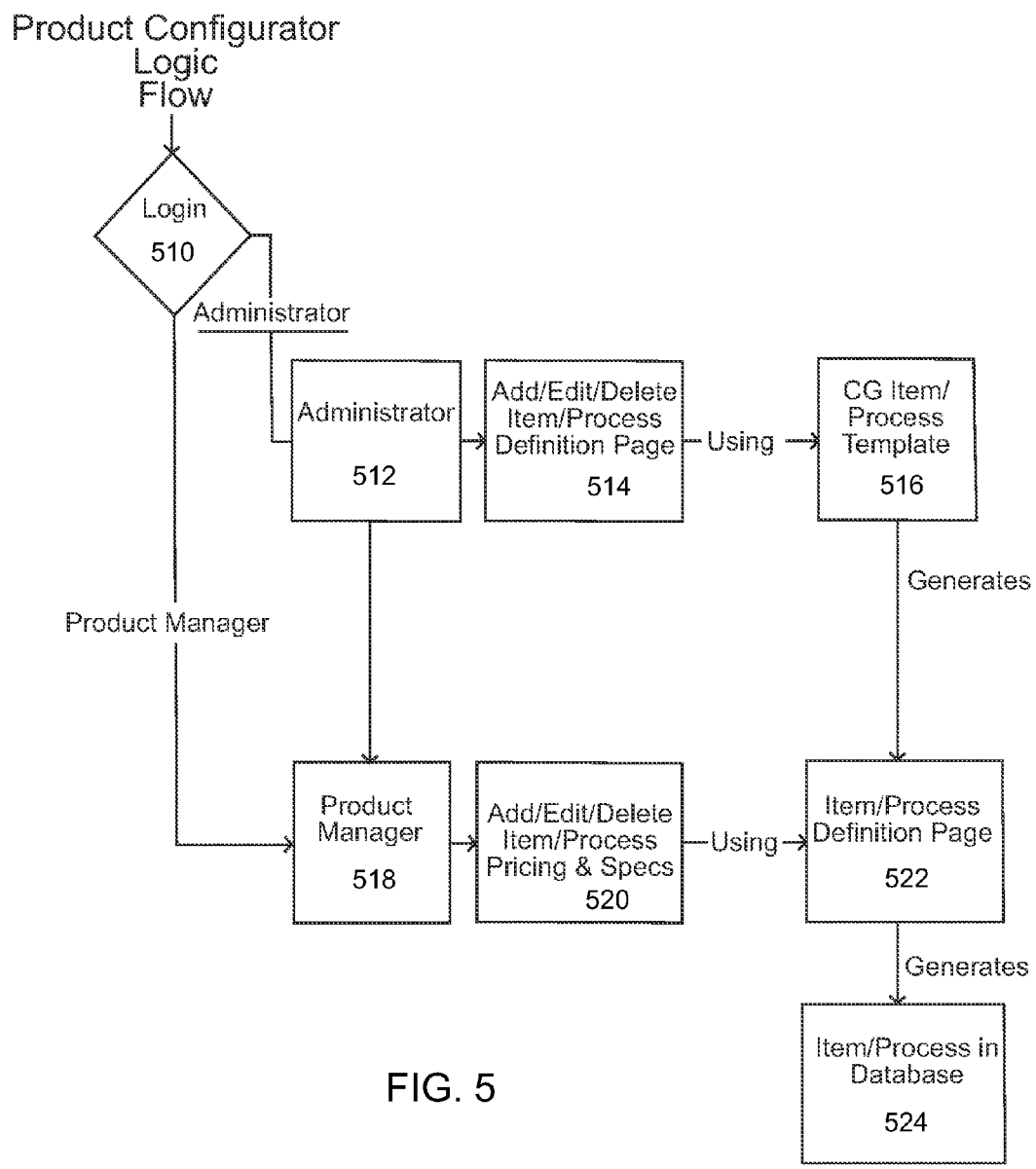
FIG. 5 is a flow diagram of an item and process specification method according to an embodiment of the subject matter disclosed herein.

The subject matter disclosed herein may separate the item and process specification methods into various levels using templates, as shown in FIG. 5. A user may access the method and system of the subject matter disclosed herein by logging in to the system at 510. Standard item or process templates may be supplied through the subject matter disclosed herein. A vendor administrator 512 (or other entity) may create item or process definition pages 514 based on the standard item or process templates 516. A vendor product manager 518 (or other entity) may enter the item or process specifications and pricing information 520 using the item or process definition pages 5222. Items and processes may then be searched and matched based on materials or other specifications and stored in a database, at 524. A specific item template may be used in conjunction with several types of items with similar characteristics. Similarly, a specific process template may be used for several types of processes with similar characteristics or functions.

Another feature of the subject matter disclosed herein includes a pricing algorithm. The pricing algorithm may depend on the item and associated processes chosen. In general, the pricing may be based on the item and process production specifications. The manufacturing specifications for a particular promotional product may not exist until an entity has specified item parameters, process parameters, a client's artwork parameters, and other specifications. According to another feature of the subject matter disclosed herein, manufacturers may go online and update their own pricing anytime so distributors may know that the price they see is the correct and most recent price. The subject matter disclosed herein may assist the user in assessing an accurate cost with extra charges, such as setup charges, run charges, and even shipping charges.

To assist in defining items and processes, the subject matter disclosed herein may provide tables of standard data used throughout the industry for standardization. Examples may include industry colors, materials, extra charges, and other data. In addition, the subject matter disclosed herein may add and modify colors as they are required or requested by vendors to offer a complete selection of options.

Figure 6:
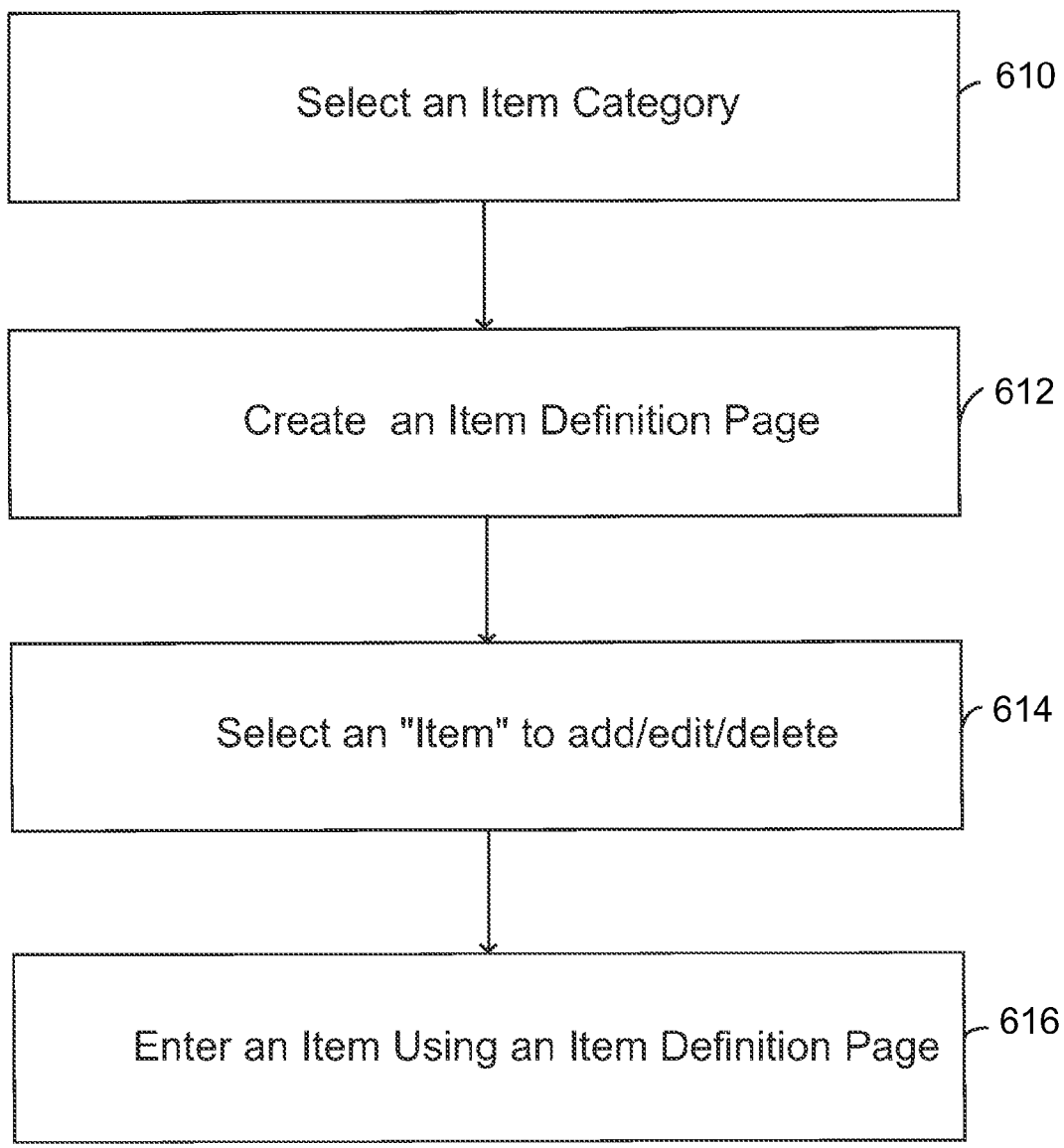
FIG. 6 is an example of a flowchart related to item templates and data entry according to an embodiment of the subject matter disclosed herein.

FIG. 6 is an example of a flowchart related to item templates and data entry according to an embodiment of the subject matter disclosed herein. At step 610, a user may select an item category. Item categories may include mugs, T-shirts, and baseball caps, for example. At step 612, the user may create an item definition page by using an item template for the selected item category. An item template may be provided for each item category. In addition, the template may be supplied by a vendor or other entity. This feature enhances consistency and uniformity where similarities may be easily identified. For example, a single item template may be used for numerous item categories. For example, mugs and stress balls may use the same (or similar) item template. At step 614, a user may select an "item" definition to add, edit, delete or perform other operations. At step 616, the user may enter an item using an item definition page. In addition, a template for item definition data entry may be supplied by a vendor or other entity.

FIG. 7 is an illustration of step 610 according to an embodiment of the subject matter disclosed herein. This feature of the subject matter disclosed herein enables an entity to create general item and process templates for a product line from templates. An entity, such as an administrator, may select an item category to add an item definition page into a database. For example, item category options may include add, edit, delete and other operations. By selecting the add option 710, a list of available item categories may be displayed. Item categories may include mugs, T-shirts, baseball caps and other categories. The drop down list may contain a list of item categories associated with item templates available through the subject matter disclosed herein. Selecting an item category takes the user to an associated item template page for that category. By selecting the edit or delete options 712 or 714, a list of existing item definition pages may be displayed. By selecting an item definition page, associated item templates with specifications previously entered may be displayed and edited.

FIG. 8 is an illustration of step 612 according to an embodiment of the subject matter disclosed herein. Using the selected item template for the item category, a user may create an item definition page for the selected category. An entity, such as an administrator, may create an item definition page using an item template. The administrator (or other entity) may specify the descriptive and pricing characteristics applicable to the item being sold or promoted. The administrator may create several item definition pages using the same item template for efficiency and uniformity purposes. For example, the item template "Mug" may generate item definition pages for "Mugs-Standard (steel)" or "Mugs-Travel (plastic)". Other item definition pages may also be generated. According to another embodiment of the subject matter disclosed herein, each item definition page may specify one or more materials. Other variations exist.

In the example of FIG. 8, the category "mugs" has been selected. At line 810, a subcategory may be identified. For example, in association with the category "mugs", subcategories may include "travel" or "standard". At line 812, colors may be identified and/or selected from a list of available colors and/or patterns. At line 814, material for the mugs may be identified and/or selected from a list of available materials. Various color and/or material combinations may also be identified. The size and variables within a pricing matrix of the subject matter disclosed herein may vary according to the type of item or process and specifications made by the administrator (or other entity) on the item or process template.

Quantity break pricing information may be specified in section 816. Miscellaneous pricing information may also be identified. For example, a charge may be applied per item as well as per color, as shown by lines 818, 820 and 821. Other miscellaneous charges may be applied as needed by a product or process involved. In addition, additional pricing information may also be identified. If the order is less than a predetermined minimum charge, an additional charge may be applied, as shown by line 822. For rush orders, a rush charge may be added, as shown by line 824. For each additional charge, the amount may be a dollar amount or a percentage of the order amount. In section 826, the user may specify one or more imprint positions, such as front, handle, back, side, etc. Other locations may also be specified, depending on the type of item selected. Other charges may be defined by the administrator (or other authorized entity).

Figure 9:
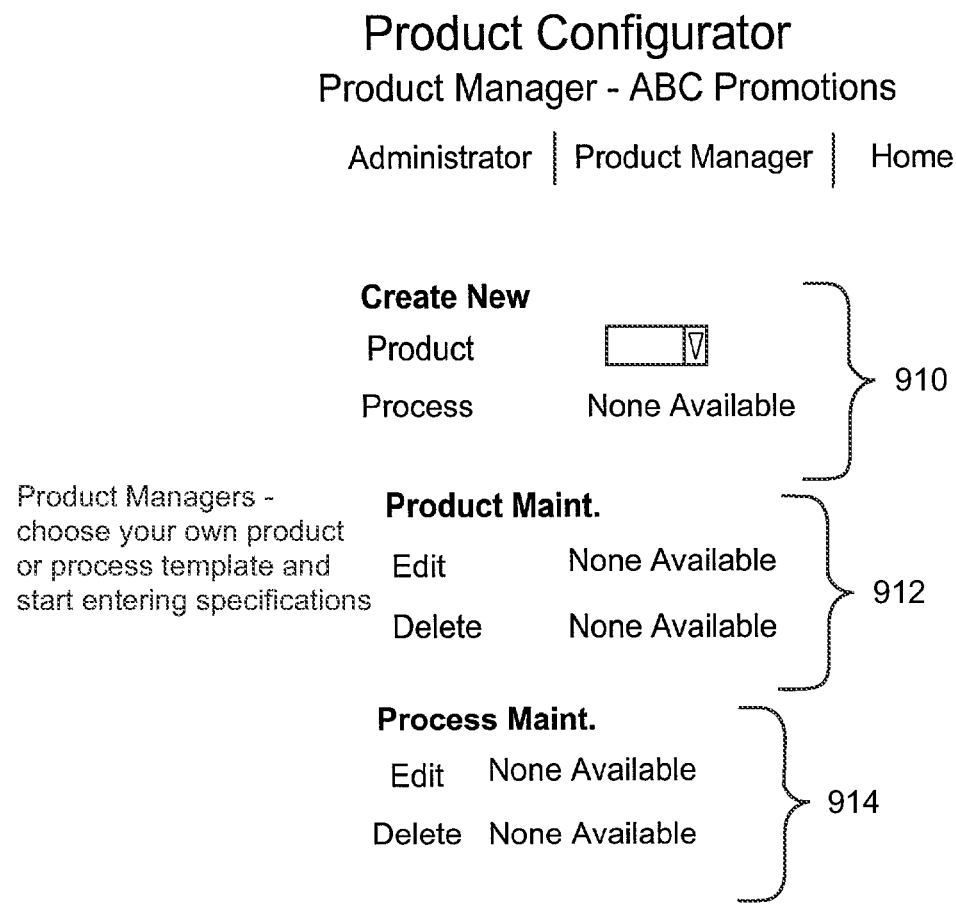
FIG. 9 is an example of a product manager page according to an embodiment of the subject matter disclosed herein.

FIG. 9 is an illustration of step 614 according to an embodiment of the subject matter disclosed herein. A user may specify individual items from previously created templates. Processes offered on one or more items may also be specified from previously created templates. A user may select an "item" to add, edit, delete and perform other operations. For a new item, the subject matter disclosed herein may display a dropdown window of existing item or process definition pages, as shown by 910. A "select" option may take the user to the item definition page previously created by the administrator (or other entity). For an existing item, the user may perform various operations, such as edit and delete, as shown by 912 and 914. A dropdown of existing items in the subject matter disclosed herein may be displayed. A "select" option may display the existing item data.

FIGS. 10*a* and 10B are an illustration of step 616 according to an embodiment of the subject matter disclosed herein. A user may enter an item using an item definition page containing a vendor's range of parameters for the selected one or more items. The user may then enter specifications for each unique item. For example, in section 1010, general information may be entered, such as product name, vendor ID number, item description, and colors. Other information may also be specified. In section 1012, quantity price break values may be specified. For example, the first two items ordered (e.g., samples) may be charged at $15.00. The user may lower the price for each item if a purchaser orders in bulk. For example, if the purchaser orders 500 items, each item may be priced at $9.00. If the purchaser orders 1002 items, each item may be priced at $7.00. In section 1014, miscellaneous price break values may be specified, such as gift box, less than minimum charge, and rush charges. These prices may be a dollar amount or a percentage of the entire order. There may also be instances where miscellaneous price breaks may not be applicable. In these instances, an "NIA" box may be selected. In section 1015, the user may select one or more allowable processes that may be processed on the indicated one or more items. The user may also select multi colors and/or patterns.

In section 1016, imprint positions may be specified. The location of the imprint as well as the size (height and width) may be indicated. Imprint positions may include one or more of front, handle, side, back and other locations as made available by the product selected. There may also be situations where an item cannot be imprinted. This may be indicated by selecting an appropriate box at 1016*a*. In section 1018, shipping information may include weight and case specifications, such as weight per item; weight per case; items per case; case width; case height; and case length. In section 1020, production time information may be identified. For example, regular production may take 14 working days. A rush order may take 7 working days. Other options may be available. In section 1022, production information may be specified. This information may include list price; list description; country of manufacturer, whether the item is union made or not, and other details.

Figure 11:
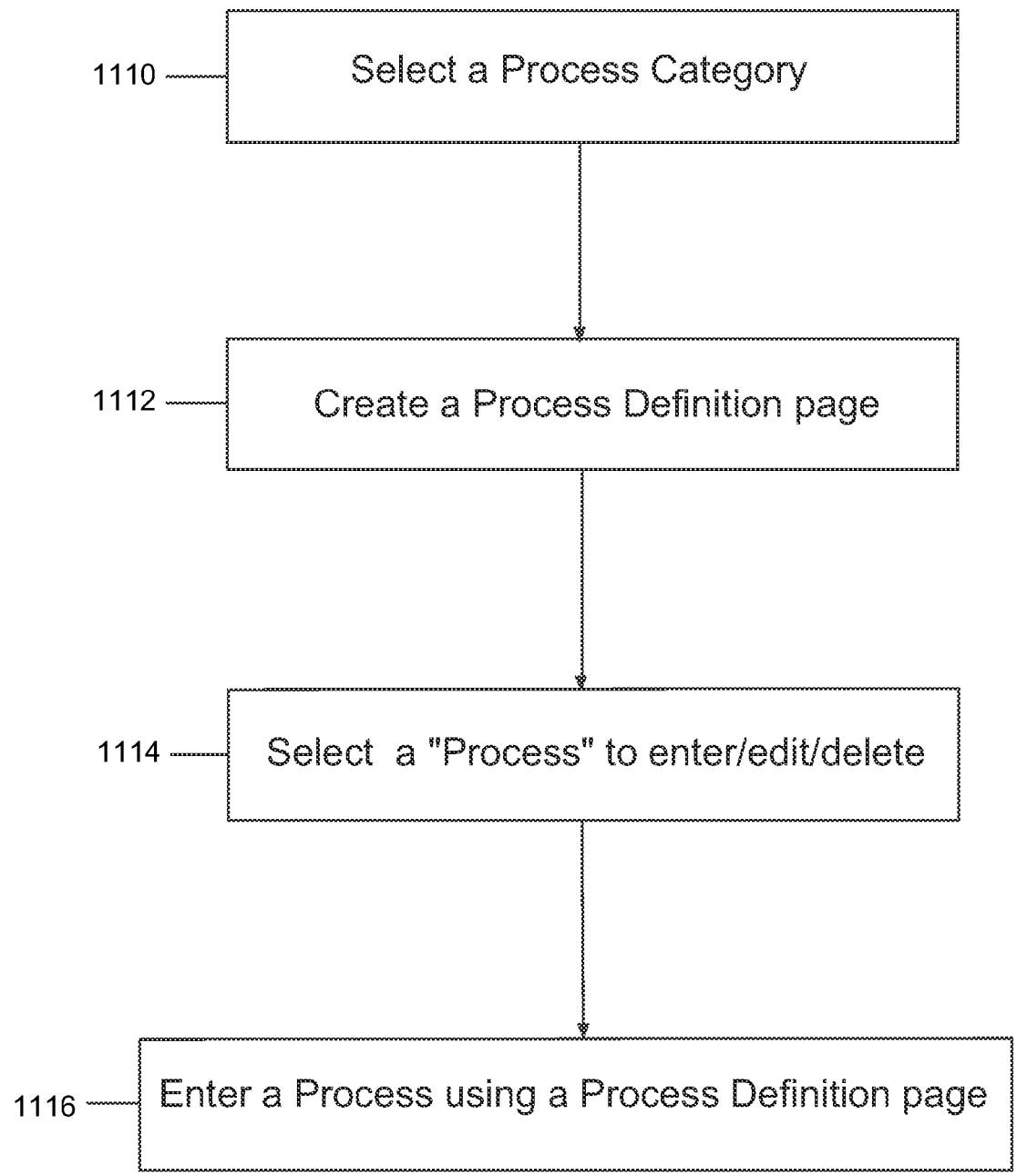
FIG. 11 is an example of a flowchart related to process templates and data entry according to an embodiment of the subject matter disclosed herein.

FIG. 11 is an example of a flowchart related to process templates and data entry according to an embodiment of the subject matter disclosed herein. At step 1110, a user may select a process category. Process categories may include screen printing, pad printing and etching, for example. At step

1112, the user may create a process definition page by using a process template for the selected process category. A process template may be provided for several process categories. This feature enhances consistency and uniformity where similarities may be easily identified. For example, screen printing and pad printing may use the same (or similar) process template. In addition, the template may be supplied by a vendor or other entity. At step 1114, a user may select a "process" to add, edit, delete or perform other operations. At step 1116, the user may enter a process using a process definition page. In addition, a template for process definition data entry may be supplied by a vendor or other entity.

FIG. 7 is an illustration of step 1110 according to an embodiment of the subject matter disclosed herein. This feature of the subject matter disclosed herein enables an entity to create general item and process templates for a product line from templates. An entity, such as an administrator, may select a process category to add a process definition page into a database. For example, process category options may include add, edit, delete and other operations. By selecting the add option 720, a list of available process categories may be displayed. Process categories may include pad printing, screen printing, etching and other categories. The drop down list may contain a list of process categories associated with process templates available through the subject matter disclosed herein. Selecting a process category takes the user to an associated process template page for that category. By selecting the edit or delete options 722 or 724, a list of existing process definition pages may be displayed. By selecting a process definition page, associated process templates with specifications previously entered may be displayed or edited.

FIG. 12 is an illustration of step 1112 according to an embodiment of the subject matter disclosed herein. Using the selected process template for the process category, a user may create a process definition page for the selected category. An entity, such as an administrator, may create a process definition page using a process template. The administrator (or other entity) may specify the descriptive and pricing characteristics applicable to the process used to display the logo or advertisement. The administrator may create several process definition pages using the same process template for efficiency and uniformity purposes. According to another embodiment of the subject matter disclosed herein, process template and definition pages may be associated with one or more materials. Other variations exist.

In the example of FIG. 12, the category "screen printing" has been selected. At line 1210, a sub category may be identified. For example, in association with the category "screen Printing", an example of a subcategory may include "standard". At line 1212, the user may specify the number of colors involved in designing the logo or advertisement. At line 1214, the material to be processed on may be identified. An additional charge for over imprint size may be applied at line 1216. Quantity break pricing information may be specified in section 1218. Miscellaneous pricing information may also be identified in section 1220. For example, miscellaneous pricing information may include a setup charge, PMS color match, one or more miscellaneous charges for additional or special colors, less than minimum charge, rush charge, metallic thread charge, moving screen and other services. Other pricing for processes may include personalization charges, production proof charges, and paper proof charges.

According to an embodiment of the subject matter disclosed herein, pricing for processes may include run charges, setup charges, and other additional charges. These charges and the variables affecting them may vary depending on the type of process (e.g., the process template used to create the process definition page). The run and setup charges may use matrices to enter pricing information. The size and variables within the pricing matrices may vary according to the type of process and specifications made by the administrator (or other entity) on the process template. For example, embossing may have a run charge based on quantity breaks and number of colors per location. In another example, embroidery may have a run charge based on quantity and number of stitches. Other factors and limitations may be applied based on the type or characteristics of process.

FIG. 13 is an illustration of step 1114 according to an embodiment of the subject matter disclosed herein. A user may select a "process" to add, edit, delete and perform other operations. For a new process, the subject matter disclosed herein may display a dropdown window of existing item or process definition pages, as shown by 1310. A "select" option may take the user to the item definition page previously created by the administrator (or other entity). For an existing process, the user may perform various operations, such as edit and delete, as shown by 1312 and 1314. In addition, a dropdown of existing processes in the subject matter disclosed herein may be displayed. A "select" option may display the existing process data.

FIGS. 14a and 14b are an illustration of step 1116 according to an embodiment of the subject matter disclosed herein. A user may enter a process using a process definition page containing a vendor's range of parameters for the selected one or more processes. The user may then enter specifications for each unique process. For example, in section 1410, general information may be entered, such as process name, vendor ID number, process description, process on material, imprint limitations and over imprint size addition. Other information may also be specified. In section 1412, quantity price break values may be specified. For example, for each additional color, there may be an additional charge. Also, the price for each color may be lower if the purchaser orders a larger quantity. In section 1414, miscellaneous price break values may be specified, such as setup charge, PMS color match, scatter color, a less than minimum charge, and rush charges. Other miscellaneous price break values may include a personalization charge, paper proof charge, production proof charge, moving screen and other options. These prices may be a dollar amount or a percentage of the item. Other variations exist. In section 1416, production information may be specified. This information may include list price per item; list description; regular production time, rush production time, country of manufacturer, whether the item is union made or not, and other details.

FIG. 15 is an example of an image upload feature according to an embodiment of the subject matter disclosed herein. When saving an image or page, the user may be presented with an option to upload an image. The user may upload one or more item or process images. The user may select a small, medium or large image view, at section 1510. This option enables the user to view placement of the logo or other artwork on the selected item.

FIGS. 16a and 16b are an example of an item or process edit page according to an embodiment of the subject matter disclosed herein. A product manager (or other authorized entity) may edit an item information page, for example. Each product may be assigned a number by the subject matter disclosed herein, under "CG Number", for example. The existing item or process information may be displayed in the item or process definition page. The user may then modify the information displayed. General information may be modified in section 1610, which may include product name, vendor id number, item description, and colors. An image of the product with a customer's logo or artwork may be shown at 1612. Quantity price break values may also be modified in section 1614.

Miscellaneous price break values may be changed in section 1616. Other miscellaneous information may include one or more of setup charge, PMS color match, personalization charge, paper proof charge, production proof charge, moving screen, gift box, less than minimum charge, a rush charge and other information. Such charges may also be indicated as not being applicable to the selected process or product.

Imprint locations may be altered by the user, at section 1618. Other information, such as over imprint size charge, may also be specified. Detailed shipping information may be modified by the user in section 1620. Production times may be changed, at section 1622. Also, production information data may be altered, at section 1624. Clicking on the image 1612 may link the user to an image upload page, as shown in FIG. 15.

Other embodiments and uses of the subject matter disclosed herein will be apparent to those skilled in the art from consideration of the specification and practice of the subject matter disclosed herein disclosed herein. The specification and examples should be considered exemplary only.

The invention claimed is:

1. A computer implemented method for configuring one or more products over a computer network, the computer implemented method comprising:
- storing product parameter data and a pricing algorithm on a non-transitory data storage device, such that the data storage device is accessible by a product parameter identifying and pricing computer system;
- transmitting, over said computer network, a graphical user interface (GUI) comprising representations of said product parameter data obtained from said data storage device;
- receiving, by said product parameter identifying and pricing computer system, a request for a branded product over said computer network, said request for a branded product including at least an item, a process, and an artwork;
- identifying, using said product parameter identifying and pricing computer system, one or more item parameters, one or more process parameters, and one or more artwork parameters;
- applying, using said product parameter identifying and pricing computer system, said pricing algorithm using the product parameter identifying and pricing computer to assign a price to the branded product, wherein the price is dynamically generated using the one or more item parameters, one or more process parameters, and one or more artwork parameters identified;
- generating a product identifier; and
- branding, using the product parameter identifying and pricing computer system, the product as requested, wherein the product is identified by the product identifier.

2. The method of claim 1, further comprising separating the product and supplying an item template.

3. The method of claim 1, further comprising separating the product further comprises creating an item definition page based on the item template.

4. The method of claim 1, further comprising separating the product further comprises supplying a process template.

5. The method of claim 4, wherein separating the product further comprises creating a process definition page based on the process template.

6. The method of claim 1, wherein the one or more item parameters comprise description information.

7. The method of claim 1, wherein the one or more process parameters comprise quantity break pricing information.

8. A computer implemented system for configurating one or more products over a computer network, the computer implemented system comprising:
- a data storage device hosting product parameter data and pricing data, addressable on said computer network, and accessible by a remote user on a user interface device;
- a product parameter identifying and pricing computer comprising a branded product creation module that generates a graphical user interface (GUI), the branded product creation module comprising: a GUI generation engine that generates a GUI representing product parameter data hosted on said data storage device and displays said GUI on said user interface device;
- an ordering module that creates a request over said computer network for a branded product wherein a user designates features for said branded product by selecting product parameter data represented by the GUI and submits said features to said product parameter identifying and pricing computer over said computer network;
- a separating module that separates said request for the branded product into at least an item, a process and an artwork;
- an identifying module that identifies one or more item parameters, one or more process parameters and one or more artwork parameters;
- a linking module that links said one or more item parameters, said one or more process parameters and said one or more artwork parameters;
- a pricing algorithm used to assign a price to said branded product wherein the price is dynamically generated by said product parameter identifying and pricing computer using the one or more item parameters, one or more process parameters, one or more artwork parameters;
- a generating module that generates a product identifier when the product is sourced, quoted or ordered; and
- a branding module for branding the product as requested, wherein the product is identified by the product identifier.

9. The system of claim 8, wherein the separating module further comprises an item template supplying module.

10. The system of claim 9, wherein the separating module further comprises an item definition page creation module operable to create an item definition page wherein the item definition page is based on the item template.

11. The system of claim 8, wherein the separating module further comprises a process template supplying module.

12. The system of claim 11, wherein the separating module further comprises a process definition page creation module operable to create a process definition page wherein the process definition page is based on the process template.

13. The system of claim 8, wherein the one or more item parameters comprise description information.

14. The system of claim 8, wherein the one or more process parameters comprise quantity break pricing information.

15. A computer implemented method for configuring one or more products over a computer network, the computer implemented method comprising:
- storing product parameter data and a pricing algorithm on a non-transitory data storage device, such that the data storage device is accessible by a product parameter identifying and pricing computer system;

transmitting, over said computer network, a graphical user interface (GUI) comprising representations of said product parameter data obtained from said data storage device;

receiving, by said product parameter identifying and pricing computer system, a request for a branded product over said computer network, said request for a branded product including at least an item, a process, and an artwork;

identifying, using said product parameter identifying and pricing computer system, one or more item parameters, one or more process parameters, and one or more artwork parameters wherein the one or more process parameters identify one or more manufacturing processes;

applying, using said product parameter identifying and pricing computer system, said pricing algorithm using the product parameter identifying and pricing computer to assign a price to the branded product, wherein the price is dynamically generated using the one or more item parameters, one or more process parameters, and one or more artwork parameters identified;

generating a product identifier; and branding, using the product parameter identifying and pricing computer system, the product as requested, wherein the product is identified by the product identifier.

* * * * *